United States Patent
Okano et al.

[19]

[11] Patent Number: 6,144,754
[45] Date of Patent: Nov. 7, 2000

[54] METHOD AND APPARATUS FOR IDENTIFYING INDIVIDUALS

[75] Inventors: Kenji Okano; Yuji Kuno, both of Tokyo, Japan

[73] Assignee: Oki Electric Industry Co., Ltd., Tokyo, Japan

[21] Appl. No.: 09/047,482

[22] Filed: Mar. 25, 1998

[30] Foreign Application Priority Data

Mar. 28, 1997 [JP] Japan .................................. 9-094545
Mar. 28, 1997 [JP] Japan .................................. 9-094547

[51] Int. Cl.$^7$ .................................................. G06K 9/00
[52] U.S. Cl. .......................................................... 382/117
[58] Field of Search ............................ 382/117; 396/51; 351/210, 209, 212

[56] References Cited

U.S. PATENT DOCUMENTS 5,291,560  3/1994  Daugman ................................ 382/117

*Primary Examiner*—Bhavesh Mehta
*Attorney, Agent, or Firm*—Venable; Robert J. Frank; Allen Wood

[57] ABSTRACT

An individual identification system and method for identifying individuals having elliptical pupils and elliptical irises. In the individual identification system, an image storage unit stores eye images, an the ellipse preparation unit prepares a plurality of ellipses, and a pixel addition unit adds up pixels laid along circumferences of the ellipses. An ellipse selection unit selects ellipses representative of the pupil and the iris among the plurality of ellipses based upon the sums of the pixels given by the pixel addition unit, whereby the parameters of the selected ellipses are output.

10 Claims, 11 Drawing Sheets

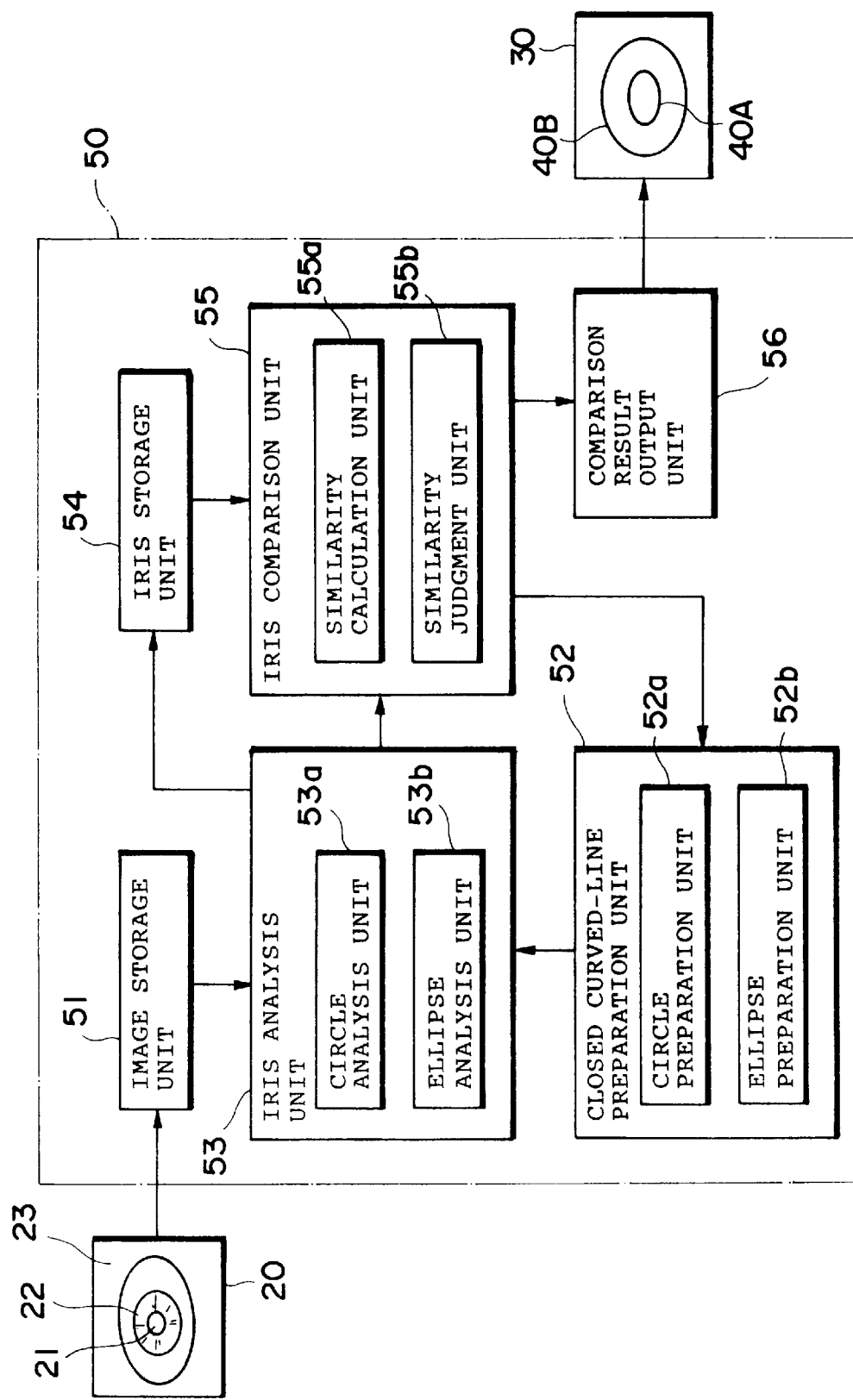

METHOD AND APPARATUS FOR IDENTIFYING INDIVIDUALS

BACKGROUND OF THE INVENTION

1. Field of the Invention

The present invention relates to a method and an apparatus for identifying individuals based upon iris textures extracted from images of individuals' eyes.

2. Description of the Prior Art

Individual identification technology is known which extracts iris textures from images of eyes including pupils and irises and identifies individuals based upon the extracted irises textures. For example, U.S. Pat. No. 5,291,560 has disclosed a typical individual identification system. Such an individual identification system converts the irises textures laid in eye images into irises codes, thus carrying out individual identification by comparing such irises codes. Accordingly, the individual identification system must acquire the positions of the irises or the outlines thereof.

In general, shapes of pupils and irises of human beings are circular. Therefore, the individual identification system prepares an imaginary circle circumscribed or inscribed with respect to the pupil of an individual. Likewise, the system prepares another circle with respect to the iris of the individual. Such a preparation of circles serves to establish a polar coordinate system on the eye image of the individual, wherein information on the position of the iris is given based upon the polar coordinate system.

Herein, the circle representative of an iris of a human being is defined by a center (Xc, Yc) and a radius R that maximize a value which is given by integrating values of pixels (X, Y) in the eye image along the circumference of the circle and differentiating the result of the integration by the radius R. Establishment of a polar coordinate system using the center (Xc, Yc) and the radius R, enables the individual identification to be immune to the influence of noise. In the polar coordinate system, the iris texture is divided into a plurality of areas, wherein the areas are converted into iris codes. The individual identification is carried out by comparing the iris code of an individual with the iris codes of other individuals. Therefore, in the individual identification system, preparing a circle for a human being's iris is essential to obtain an iris code representative of the iris.

Incidentally, pupils and irises of animals, e.g., horses are elliptical, in general. Accordingly, the conventional individual identification system cannot acquire an iris texture of a horse using a circle. For example, as shown in FIG. 12(*a*), a pupil 100 of a human being is approximately circular, and remains circular regardless of change thereof in opening. Similarly, the iris 200 is roughly circular and its shape does not depends upon opening. These make it possible to provide optimum circles representative of the iris 200, or the boundary between the pupil 100 and the iris 200 and the boundary between the iris 200 and the sclera 300. In contrast, as shown in FIG. 12(*b*), a pupil 400 of a horse is elliptical, and also the ratio of the line of apsides and the minor axis thereof depends upon change in opening. Consequently, no optimum circles representative of the pupil 400 or the iris 500 can be given. In other word, neither the boundary between the pupil 400 and the iris 500 nor the boundary between the iris 500 and the sclera 600 are obtained. This makes it impossible to carry out individual identification of a horse.

In addition, there exists an irial granule 700 along the boundary between the pupil 400 and the iris 500, in particular along the upper part thereof, which is common to the ruminants such as cattle, goats, and sheep. Further, the shape of the irial granule 700 depends upon individuals. Accordingly, accurate detection of the pupil 400 or the iris 500 is required to be immune to the presence of the irial granule 700.

Even shapes of human beings' eyes in eye images change according to photographic conditions, and more exactly, the shapes of human beings' pupils and irises sometimes become elliptical. Therefore, assuming that the pupil and the iris change into an elliptical shape, use of circles to approximate the outlines of the pupil 100 and the iris 200 deteriorates the accuracy with which individuals can be identified.

As shown in FIGS. 13(*a*)–(*c*), there might be several circles 900a~900c similar to one elliptical pupil 800. This is because the state of the outline of the pupil 800, e.g., brightness and contrast thereof, allows such different circles 900a~900c to arise. In FIGS. 13(*a*)–(*c*), the pupil 800 is in contact with the circles 900a~900c by the sides, top, and bottom thereof, respectively. In addition to these circles 900a~900c, there appear to exist other circles. Similarly, an iris might have a plurality of circles.

As discussed above, the conventional individual identification system acquires a position, or an outline representative of an elliptical pupil and an elliptical iris by preparing respective circles which are approximate thereto. Accordingly, it is difficult to acquire an accurate outlines or an accurate positions of an elliptical pupil and an elliptical iris, which deteriorates the performance of individual identification systems.

SUMMARY OF THE INVENTION

It is therefore an object of the present invention to provide a method and an apparatus which are capable of acquiring the position of an iris for each individual precisely.

According to one aspect of the present invention, there is provided, in an individual identification system which identifies individuals by comparing irises thereof, an iris detection system which detects a position of an iris laid in an eye image of an individual, the iris position detecting system comprising: an ellipse preparation circuit preparing a plurality of ellipses related to the iris by changing a plurality of parameters of the ellipses; a pixel value addition circuit adding values of pixels corresponding to the circumference of each ellipse to produce a pixel sum for each ellipse; an ellipse selection circuit selecting among the plurality of ellipses an ellipse that is representative of the outline of the iris based upon pixel sums of the plurality of ellipses; and an outline decision circuit deciding that the parameters of the selected ellipse are representative of the position of the iris.

According to another aspect of the present invention, there is provided, In an individual identification system which identifies individuals by comparing irises thereof, an iris detection system which detects a position of an iris laid in an eye image of an individual, the iris position detecting system comprising: a first closed curved-line preparation circuit preparing a first closed curved-line similar to the iris; a first similarity calculation circuit calculating a first similarity between the iris and the first closed curved-line; a first judgment circuit judging whether or not the first similarity satisfies a first given similarity; a first decision circuit that the first closed curved-line is representative of the outline of the iris upon judgment that the first similarity satisfies the first given similarity; a second closed curved-line preparation circuit preparing a second closed curved-line similar to the iris upon judgment that the first similarity does not satisfy the first given similarity; a second similarity calculation circuit calculating a second similarity between the iris and the second closed curved-line; a second judgment circuit judging whether or not the second similarity satisfies a second given similarity; a second decision circuit decides that the second closed curved-line is representative of the outline of the iris upon judgment that the second similarity satisfies the second given similarity.

BRIEF EXPLANATION OF THE DRAWINGS

FIG. 7 is a block diagram showing the individual identification system according to the second embodiment;

DESCRIPTION OF THE PREFERRED EMBODIMENTS

Hereinafter, preferred embodiments of the individual identification system according to the present invention will be described with reference to the accompanying drawings. The explanation will principally concern detection of the boundary between a pupil and an iris. However, detecting the boundary between an iris and a sclera is similarly carried out.

<First Embodiment>

Figure 1:
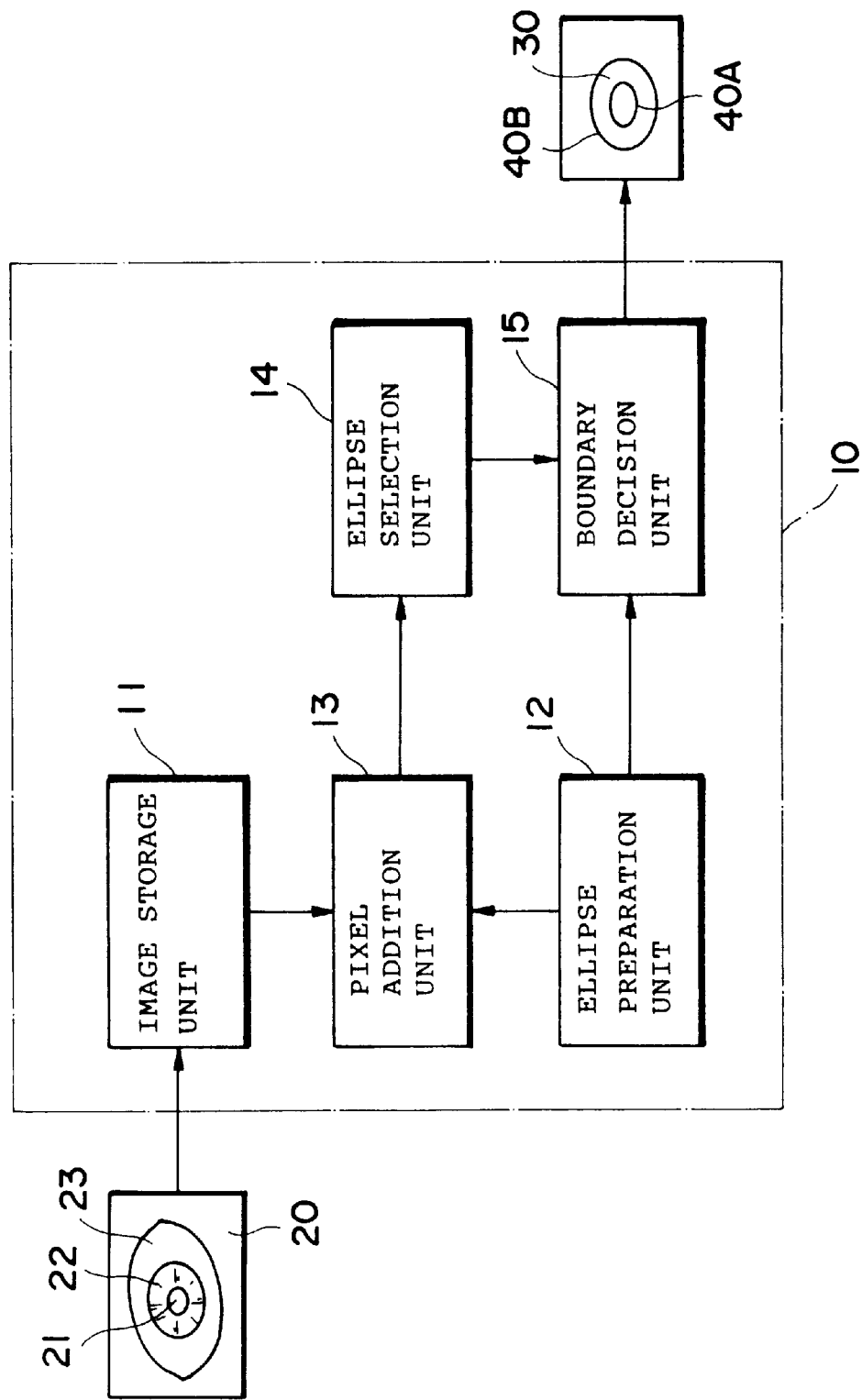
FIG. 1 is a block diagram showing the individual identification system according to the first embodiment.

FIG. 1 shows a configuration of the individual identification system of the first embodiment. In FIG. 1, the individual identification system 10 incorporates an image storage unit 11, an ellipse preparation unit 12, a pixel addition unit 13, an ellipse selection unit 14, and a boundary decision unit 15. The individual identification system 10 detects the boundary between a pupil 21 and an iris 22 and the boundary between the iris 22 and a sclera 23 in an eye image 20 of an individual to extract an iris texture 30 from the eye image 20, thus identifying the individual having the iris texture 30.

The image storage unit 11 stores eye images of a plurality of individuals. Among the eye images, there are stoved images of horses having elliptical pupils and elliptical irises and images of human beings having circular pupils and circular irises, for example. The eye images, which are digitized to includes a plurality of pixels, are fed by a video camera or a videocassette recorder. The image storage unit 11 has also an auxiliary storage such as a semiconductor memory or a disk storage.

The ellipse preparation unit 12 prepares a plurality of ellipses 40, which includes ellipses 40(1)~40(n). The plurality of ellipses 40 are prepared by changing within a given range a plurality of parameters which define the ellipses 40.

Figure 2:
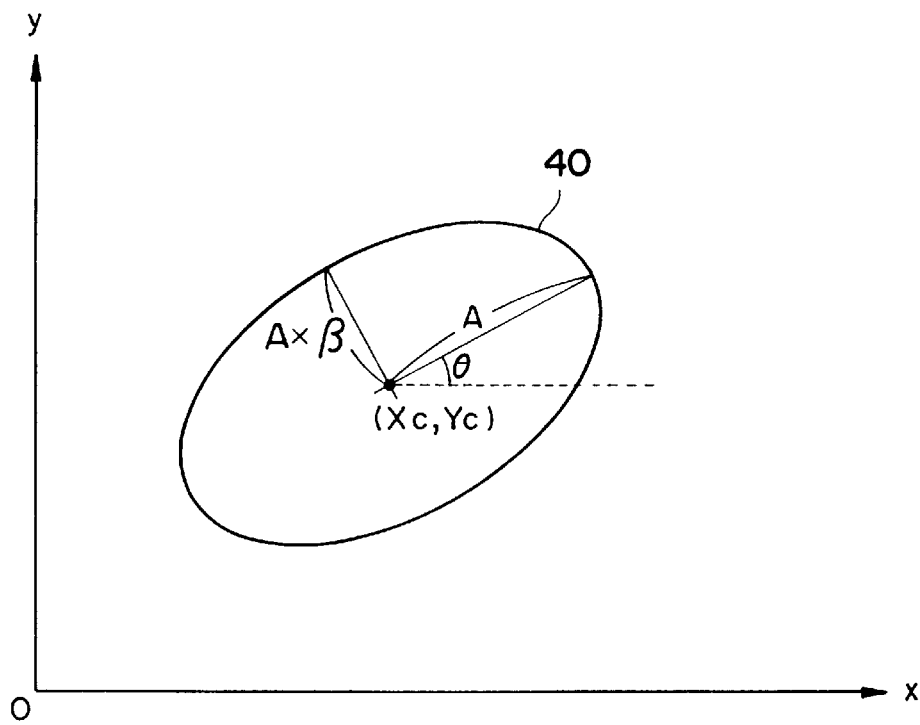
FIG. 2 is a diagram showing ellipses and parameters thereof.

The typical parameters are a center, a line of apsides, ratio thereof to a minor axis, and inclination of the line of apsides to the X coordinate axis, all of which are represented by (Xc, Yc), A, β, and θ respectively in FIG. 2. In lieu of the line of apsides A and the inclination θ thereof, the minor axis and the inclination thereof may be available. Similarly, in place of the combination of the line of apsides A and the ratio β thereof to the minor axis, the combination of the minor axis and the ratio β thereof to the line of the apsides A, or the combination of the minor axis and the line of the apsides A may be available.

The pixel addition unit 13 sums up values of pixels corresponding to the circumference of each of the ellipses 40, which includes ellipses to produce a pixel sum for each circumference. However, according to necessity, the pixel addition unit 13 does not add several pixels corresponding to a given part of the circumference.

The ellipse selection unit 14 selects two ellipses 40(1) and 40(2) arbitrarily among the plurality of ellipses 40, for example. Further, the ellipse selection unit judges whether the ellipse ellipse 40(1) and the 40(2) are representative of the boundary between the pupil 21 and the iris 22, based upon the pixel sums.

The boundary decision unit 15 decides that the ellipses 40(1) and 40(2) are representative of the boundary of the pupil 21 and the iris 22 pursuant to the judgment of the ellipse selection unit 14. More definitely, the boundary decision unit 15 provides the parameters for defining the ellipses 40(1) and 40(2), respectively. Hence, the ellipses 40(1) and 40(2) give the whole boundary between the pupil 21 and the iris 22.

Figure 3:
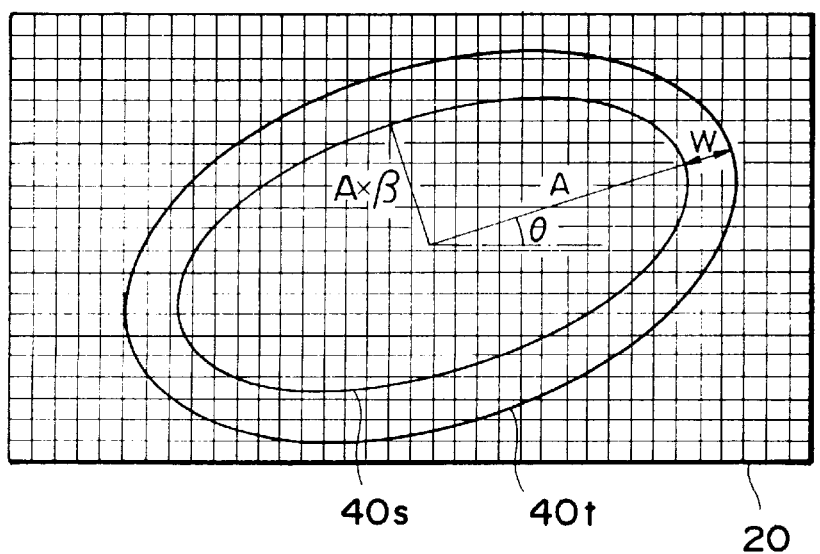
FIG. 3 is a diagram showing pixels laid in an eye image and ellipses for use in detecting the position of an iris.

FIG. 3 shows two arbitrary ellipses 40(s) and 40(t) (1≦s≦n, 1≦t≦n) among the ellipses 40. As shown in FIG. 3, both the ellipses 40(s) and 40(t) have a common center (Xc, Yc), and the line of apsides of the ellipse 40(s) is A and that of the ellipse 40(t) is A+W, where W denotes a preselected length that is expected to serve to detect the boundary between the pupil 21 and the iris 22. The pixel addition unit 13 sums up the values of pixels along the circumference of the ellipse 40(s) and also sums up the values of pixels along the circumference of the ellipse 40(t). The pixel addition unit 13 carries out subtraction of the sum of the ellipse 40(s) and the sum of the ellipse 40(t) to give the difference 40(s)–40(t). The ellipse selection unit 14 and the pixel addition unit 13 repeat the above operation.

More specifically, for example, the ellipse selection unit 14 selects an ellipse 40(1) and an ellipse 40(2). The pixel addition unit 13 acquires the difference 40(1)–40(2) between the total of values of the pixels along the circumference of the ellipse 40(1) and the total of values of the pixels along the circumference of the ellipse 40(2). As a result, the difference 40(1)–40(2) is produced. In addition to the difference 40(1)–40(2), n times repetition gives other differences 40(2)–40(3), 40(3)–40(4), . . . , and 40(n−1)–40(n), for example. In short, the ellipse selection unit 14 and the pixel addition unit 13 provide a plurality of differences with respect to sums of pixels of the circumferences of the plurality of ellipses 40.

Finally, the boundary decision unit 15 decides that the combination of two ellipses having the largest difference is representative of the boundary between the pupil 21 and the iris 22. The reason for using such a difference between two circumferences is because the contrast between a pupil 21 and an iris 22 is sharper than other contrasts.

As the image storage unit 11, the ellipse preparation unit 12, the pixel addition unit 13, and the ellipse selection unit 14, and the boundary decision unit 15, programming or software is available. Therefore, the individual identification system may incorporate a common personal computer and a storage such as a floppy diskette and a CD-ROM storing the programs.

Hereinafter, the operation of the individual identification system of the first embodiment will be described in detail. The explanation will proceed on assumption that a plurality of images of eyes of horses are stored in the image storage unit 11, the images have a multiple scale of white and black pixels, and each pixel is specified pursuant to the X coordinate axis and the Y coordinate axis.

Figure 4:
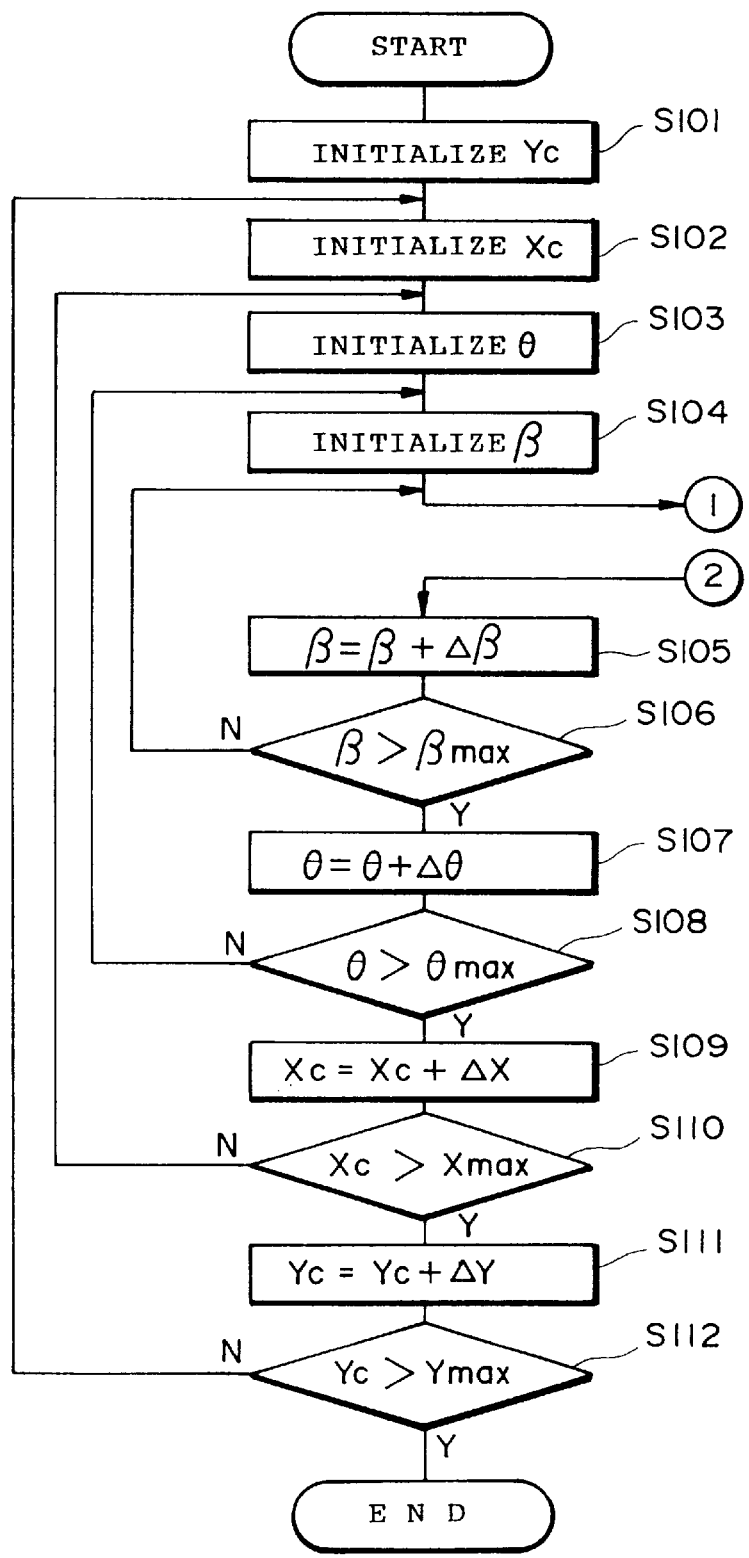
FIG. 4–FIG. 6 are flowcharts showing processes of the individual identification system of the first embodiment.

FIG. 4 is a flowchart showing the operation of the ellipse preparation unit 12, in which the ellipse preparation unit 12 prepares a plurality of ellipses for an eye of a horse. Briefly explaining the operation of the ellipse preparation unit 12, as discussed above, the ellipse preparation unit 12 prepares a large number of ellipses 40 by changing the parameters defining those ellipses 40.

The ellipse preparation unit 12 changes a center (Xc, Yc), half of a line of apsides A, a ratio $\beta$ thereof to a minor axis, and inclination $\theta$ thereof to the X coordinate axis within respective given ranges with the minimum value, the maximum value, and the step as follows:

range of Xc: from Xmin to Xmax by $\Delta$X
range of Yc: from Ymin to Ymax by $\Delta$Y
range of A: from Amin to Amax by $\Delta$A
range of $\beta$: from $\beta$ min to $\beta$ max by $\Delta\beta$
range of $\theta$: from $\theta$ min to $\theta$ max by $\Delta\theta$ First, in steps 101–104, each parameter except the line of apsides A is initialized to be given a initial value, or the minimum value A0. More exactly, the center Yc and Xc are set to Y0 and X0, the inclination $\theta$ is set to 0, and the ratio $\beta$ is set to 0.1. After initialization of the parameters, the procedure advances to the operations of preparing ellipses 40.

Hereinafter, the operations of preparing ellipses will be described with reference to FIGS. 5 and 6. In the following explanation, M denotes the number of a pixel (hereinafter called the pixels number) which is laid along the circumference of a prepared ellipse and is sampled by the pixel addition unit 13, and PS denotes a variable used for acquiring the sum of values of M pixels.

First, in step 201, the ellipse preparation unit 12 initializes the line of apsides A. In step 202, the ellipse preparation unit 12 also initializes the pixel's number M and the variable PS to set them to 0. Next, in step 203, the pixel of the pixel's number 0 is judged to be added up or not. If yes, the procedure advances to step 204, and otherwise to step 206. In step 204, the value of the pixel of the pixel's number 0 is calculated. Herein, for easy calculation, the coordinate (X, Y) of the pixel of the pixel's number 0 is given as follows. The coordinate (Xtemp, Ytemp) of a pixel which is laid on the circumference of a temporary ellipse having the line of apsides Rmin, the ratio $\beta$ min, and the origin (0, 0) is produced; the produced circumference is rotated by zero degrees counterclockwise; and the rotated circumference is moved parallel by the distance between the center (X0, Y0) and the origin (0, 0). Hence, the coordinate (X, Y) of the pixel of the pixel's number 0 is obtained. Thereafter, in step 205, the image storage unit 11 reads the value of the pixel of the pixel's number 0, wherein the value is added up to the variable PS. In step 206, the pixel's number M increments from 0 to 1.

In step 207, the pixel's number M is judged to be larger than the maximum Mmax or not. If not, the procedure returns to step 203, and otherwise it advances to step 208. In step 203, the above operations in steps 203~206 are repeated. More specifically, if judged to be added in step 203, the value of the pixel of the pixel's number M is added up to the variable PS. In this way, values of the pixels of the pixel's number M=0~Mmax are summed up. In other word, if the coordinate of the pixel of the pixel's number M is referred to as (X(M), Y(M)), the values of pixels (X(M0), Y(M0)~(X(Mmax), Y(Mmax)) are summed up, which represents the sum of these pixels laid along the circumference of the ellipse defined by the center (Xc, Yc)=(X0, Y0), the inclination $\theta$=0, and the ratio $\beta$=0.1, and the line of apsides A=A0.

In contrast, in step 208, the pixel addition unit 13 stores the variable PS as the pixel sum PS (Xc=X0, Yc=Y0, $\theta$=0, $\beta$=0.1, A=A0). As will be described later, such a pixel sum PS serves to decide ellipses representative of the boundary of the pupil 21 and the iris 22.

Thereafter, in step 209, the line of apsides A develops from A0 to A1. In step 210, the line of apsides A2 is judged to be larger than Amax or not. If not, the procedure returns to step 202, and otherwise it advances to step 301.

In step 202, the pixel's number M and the variable PS are initialized to be set to 0. Concerning the line of apsides A1, the processes similar to the line of apsides A0 are repeated, whereby the pixel sum PS (Xc=X0, Yc=Y0, $\theta$=0, $\beta$=0.1, A=A1) is obtained. In this way, other pixel sum PSs (Xc=X0, Yc=Y0, $\theta$=0, $\beta$=0.1, A=A2)~(Xc=X0, Yc=Y0, $\theta$=0, $\beta$=0.1, A=Amax) are provided. Consequently, the ellipses 40 (Xc=X0,Yc=Y0, $\theta$=0, $\beta$=0.1,A=A0)~(Xc=X0, Yc=Y0, $\theta$=0, $\beta$=0.1, A=Amax), which are equivalent to the ellipses 40, are given the pixel sum PSs (Xc=X0, Yc=Y0, $\theta$=0, $\beta$=0.1, A=A0)~(Xc=X0, Yc=Y0, $\theta$=0, $\beta$=0.1, A=Amax), respectively. These ellipses 40 are abbreviated as ellipses 40 ( ) while these pixel sum PSs are abbreviated as pixel PS ( ) below according to necessity.

Figure 5:
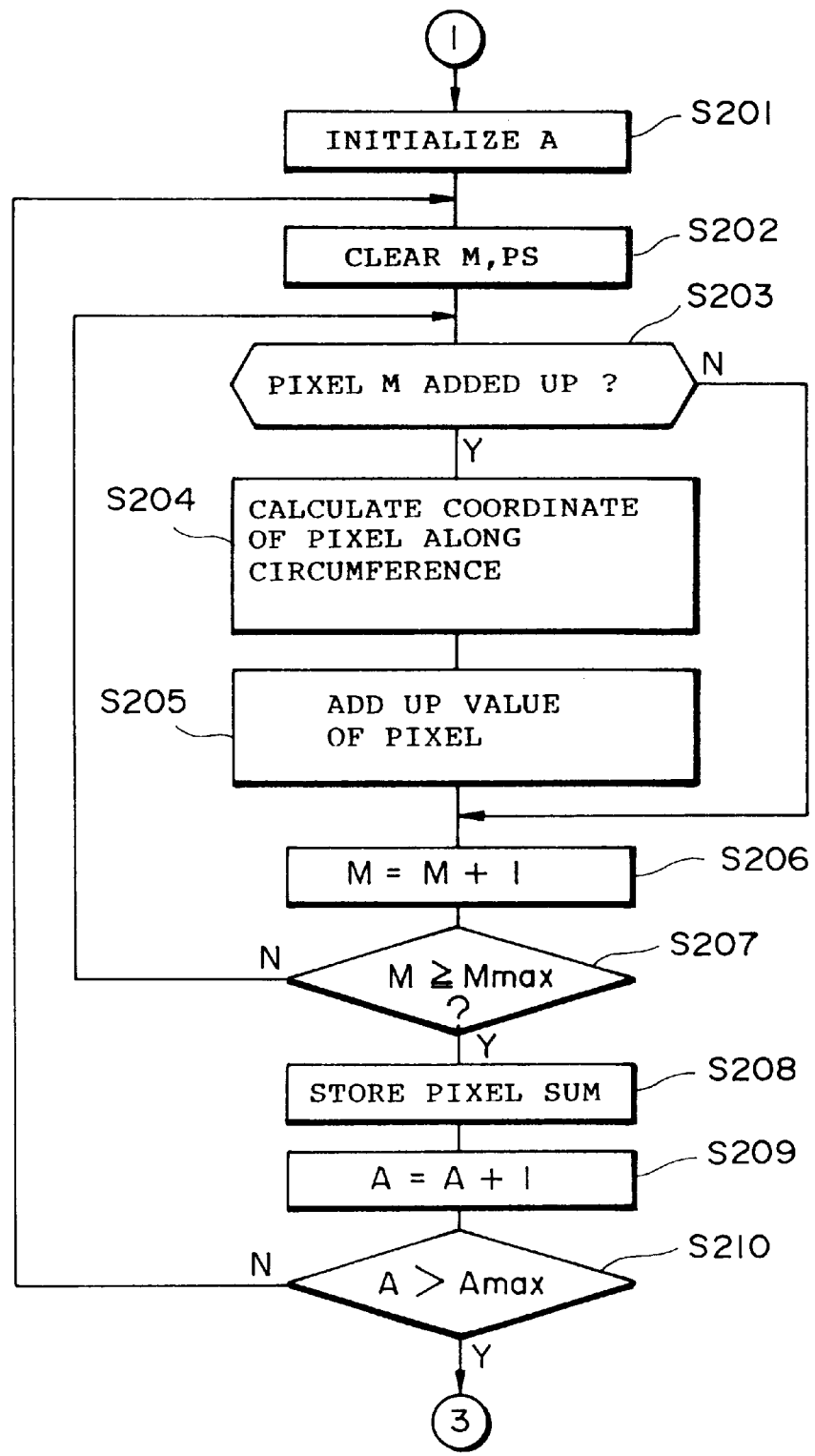
Figure 6:
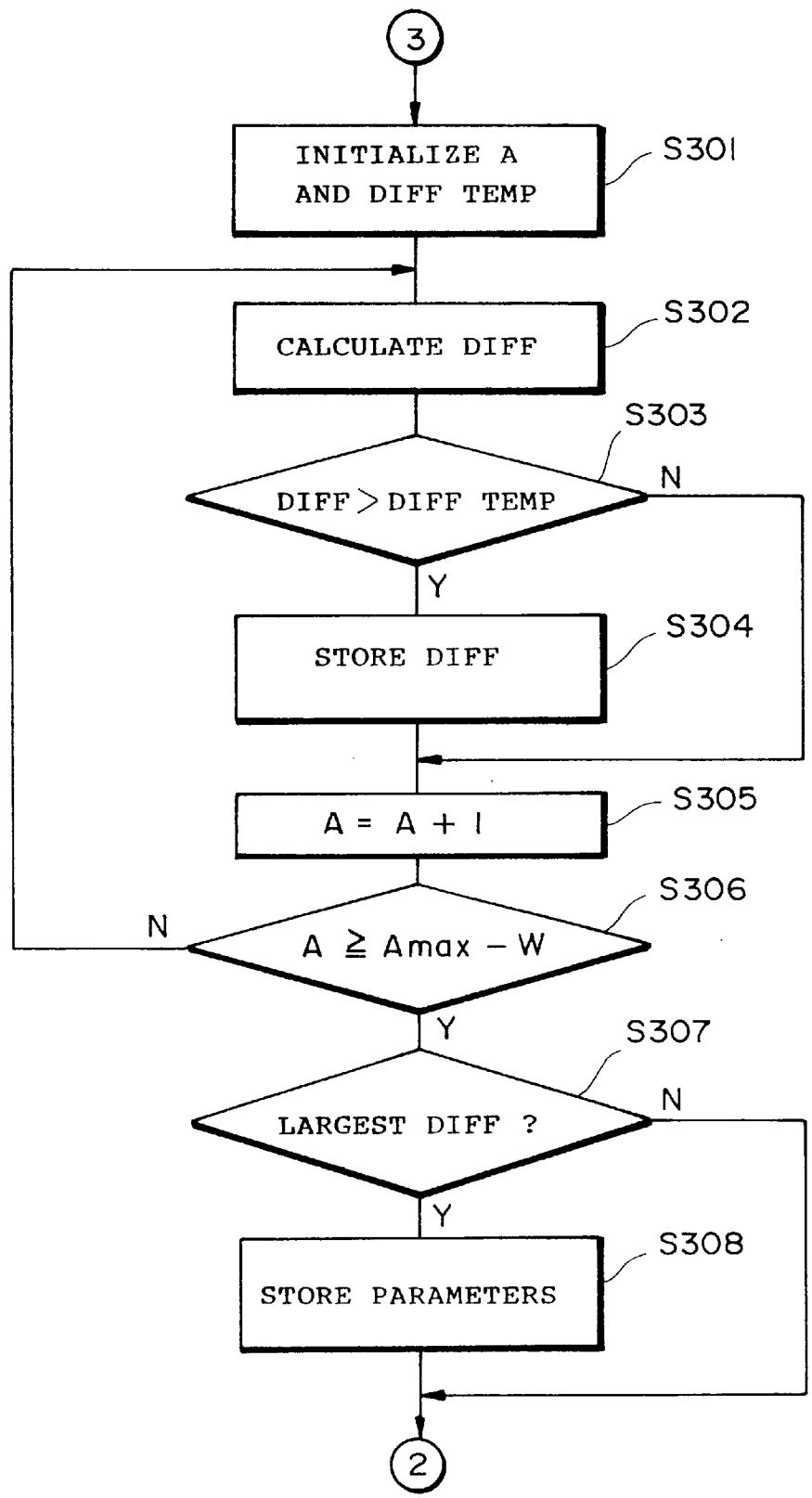

After those operations, as shown in FIGS. 5 and 6, the procedure returns to step 105 in FIG. 4. The ellipse preparation unit 12 judges whether or not each of the parameters reaches the final value, or the maximum value in steps 105~111.

While all the parameters are below the respective maximum values, the ellipse preparation unit 12 continues to increment the parameters, whereby repetition of the procedure in FIGS. 5 and 6 produces a large number of ellipses 40 ( ). Once all of the parameters exceed the respective maximum values, the ellipse preparation unit 12 stops incrementing, which completes preparing ellipses.

Hereinafter, processes by the ellipse selection unit 14 and the boundary decision unit 15 will be described referring to FIG. 6. The processes are summarized by stating that the ellipse selection unit 14 selects one among the ellipses 40 ( ), based upon the pixel sums PS ( ). More definitely, the ellipse selection unit 14 searches such a line of apsides Ai (A0$\leq$Ai$\leq$Amax) as makes the largest difference DIFF between a pixel sum PS (Xc=X0, Yc=Y0, $\theta$=0, $\beta$=0.1, A=Ai) and another pixel sum PS (Xc=X0, Yc=Y0, $\theta$=0, $\beta$=0.1, A=A(i)+W)), thus acquiring an ellipse 40 (Xc=X0, Yc=Y0, $\theta$=0, $\beta$=0.1, A=Ai) that is deemed to be most similar to the boundary of the pupil 21 and the iris 22. These difference DIFFs are abbreviated as the difference DIFFs ( ) according to necessity.

First, in step 301, the line of apsides A and the difference DIFFtemp are initialized to be set to A0 and 0, respectively. The difference DIFFtemp temporarily stores the largest difference DIFF between a pixel sum PS ( ) and another pixel sum PS ( ) one by another below. In step 302, a difference DIFF between the pixel sum PS (Xc=X0, Yc=Y0, θ=0, β=0.1, A=A0) and the pixel sum PS (Xc=X0, Yc=Y0, θ=0, β=0.1, A=A0+W) is calculated, which is referred to as the difference DIFF (Xc=X0, Yc=Y0, θ=0, β=0.1, A=A0). ThedifferenceDIFF(Xc=X0, Yc=Y0, θ=0, β=0.1, A=A0) is judged to be larger or not than the difference DIFFtemp, in step 303. If yes, the difference DIFF (Xc=X0, Yc=Y0, θ=0, β=0.1, A=A0) is stored as the difference DIFFtemp, and otherwise the difference DIFFtemp remains unchanged. Here, assuming difference DIFF (Xc=X0, Yc=Y0, θ=0, β=0.1, A=A0) is larger than the difference DIFFtemp, the difference DIFF (Xc=X0, Yc=Y0, θ=0, β=0.1, A=A0) is stored as the difference DIFFtemp with the line of apsides A0, in step 304. Thereafter, the line of apsides A increments A0 to A1, in step 305. If the line of apsides A1 is smaller than the line of apsides Amax minus the width W, the processes in steps 302, 303, 304, and 305 are repeated. More specifically, the difference DIFF (Xc=X0, Yc=Y0, θ=0, β=0.1, A=A1) between the pixel sum PS (Xc=X0, Yc=Y0, θ=0, β=0.1, A=A1) and the pixel sum PS (Xc=X0, Yc=Y0, θ=0, β=0.1, A=A1+W) is calculated, whereby the difference DIFF (Xc=X0, Yc=Y0, θ=0, β=0.1, A=A1) is compared with the difference DIFFtemp, that is to say, the difference DIFF (Xc=X0, Yc=Y0, θ=0, β=0.1, A=A0). If the former is larger, the difference DIFFtemp remains unchanged, and otherwise the difference DIFF (Xc=X0, Yc=Y0, θ=0, β=0.1, A=A1) is stored as the difference DIFFtemp. In this way, the largest difference DIFF (Xc=X0, Yc=Y0, θ=0, β=0.1, A=Ai) is detected among the difference DIFFs (Xc=X0, Yc=Y0, θ=0, β=0.1, A=A0)~(Xc=X0, Yc=Y0, θ=0, β=0.1, A=Amax−W).

In step 306, once the line of apsides A is larger than (Amax−W), the procedure advances to step 307. In step 307, for example, the current largest difference DIFF (Xc=X0, Yc=Y0, θ=0, β=0.1, A=Ai) and the new difference DIFF (Xc=X0, Yc=Y0, θ=0, β=0.2, A=Ai) is compared. If the difference DIFF (Xc=X0, Yc=Y0, θ=0, β=0.2, A=Ai) is larger than the difference DIFF (Xc=X0, Yc=Y0, θ=0, β=0.1, A=Ai), the difference DIFF (Xc=X0, Yc=Y0, θ=0, β=0.2, A=Ai) is substituted for the difference DIFF (Xc=X0, Yc=Y0, θ=0, β=0.1, A=Ai) as the difference DIFFtemp, wherein the parameters therefor are stored in step 308. In addition, the center coordinate, inclination, ratio, and line of apsides of the ellipse corresponding to the resultant difference DIFFtemp are stored. For example, assuming that the resultant difference DIFFtemp is the difference DIFF (Xc=X0, Yc=Y0, θ=0, β=βj, A=Ai), the center coordinate (X0, Y0), the inclination 0, the ratio βj, and the line of apsides Ai are stored. In step 307, if not, the difference DIFFtemp remains unchanged, that is, the difference DIFFtemp is left as the difference (Xc=X0, Yc=Y0, θ=0, β=0.1, A=A0).

In consequence of the repetition of the above processes, there are given other difference DIFFs (Xc=X0, Yc=Y0, θ=0, β=0.1, A=Ai)~(X=X0, Yc=Y0, θ=0, β=βmax, A=Ai). Moreover, among those difference DIFFs ( ), the largest difference DIFF (Xc=X0, Yc=Y0, θ=0, β=βj, A=Ai) is selected. Finally, through steps 106~112, the maximum difference DIFF (Xc=Xm, Yc=Y1, θ=θm, βj, Ai) is selected among the difference DIFFs (Xc=X0, Yc=Y0, θ=0, β=0.1, A=A0)~(Xc=Xmax, Yc=Ymax, θ=θmax, β=βmax, A=Amax).

As described above, since the individual identification system 10 of the first embodiment changes several parameters of ellipses, it can give an ellipse precisely similar to the boundary. This enables accurate individual identification of human beings' pupils or irises that change into an elliptic shape depending upon the photographic conditions as well as accurate individual identification of elliptic pupils and irises like horses. More definitely, changing a center coordinate, a line of apsides, a ratio thereof to a minor axis, and an inclination of the line of apsides enables production of an outline of a pupil and an iris in a deformed eye image and in an inclined eye image.

In addition, comparing pixel sums of pixels laid along the circumferences with each other makes it possible to acquire the outline of the pupil or iris readily and rapidly without any complicated arithmetic operation. Further, searching such a combination of a pixel sum and another pixel sum as maximizes the difference therebetween can give an ellipse precisely approximate to the outline of a pupil or an iris. Moreover, summing up, except for pixels laid along a given part of the circumference, enables acquisition of the outlines of pupils and irises, for example, of horses having an irial granule around the boundary between the pupils and the irises.

<Second Embodiment>

Hereinafter, the individual identification system of the second embodiment will be described. As shown in FIG. 7, the individual identification system 50 incorporates an image storage unit 51, a closed curved-line preparation unit 52, an iris analysis unit 53, an iris storage unit 54, an iris comparison unit 55 and a comparison result output unit 56.

The configuration and function of the image storage unit 51 is the same as that of the image storage unit 11 of the first embodiment. The closed curved-line preparation unit 52 prepares closed curved-lines similar to the outline of pupils and irises laid in the eye image 20 stored in the image storage unit 51.

Figure 8A:
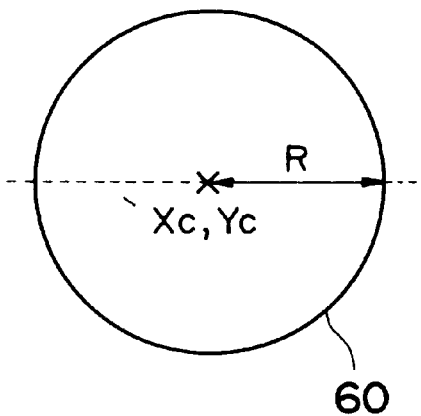
FIG. 8(a) and FIG. 8(b) are diagrams showing a circle, an ellipse, and parameters thereof.
Figure 8B:
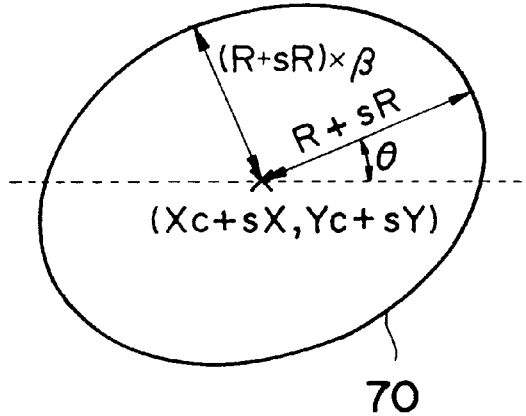

The closed curved-line preparation unit 52 incorporates a circle preparation unit 52a and an ellipse preparation unit 52b. The circle preparation unit 52a prepares circles as the closed curved-lines by changing parameters for the circles while the ellipse preparation unit 52b prepares ellipses thereas by changing parameters for the ellipses. Among the parameters for the circles, there are laid a center coordinate (Xc, Yc) and a radius R, as shown in FIG. 8(a). Among the parameters for the ellipses, there are laid a center coordinate (Xc+sX, Yc+sY), a line of apsides (R+sR), a ratio β of the line of apsides to the minor axis, and an inclination θ, ranges of steps of which depend upon the size of the eye images 20 and the size of irises 22 laid therein, wherein sX, sY, and sR denote correction amount or adjustment amount to acquire the center coordinate of the ellipse 70 based upon the center coordinate of the circle 60. As discussed in the first embodiment, in lieu of the those parameters, other parameters are available.

Returning to FIG. 7, the iris analysis unit 53 analyzes irises 22 laid in the eye images 20 based upon the closed curved-lines prepared by the closed curved-line preparation unit 52, that is to say, based upon the circles 60 prepared by the circle preparation unit 52a and the ellipses 70 prepared by the ellipse preparation unit 52b. As the method of analyzing irises, U.S. Pat. No. 5,291,560 that prepares iris codes is incorporated by reference. The iris analysis unit 53 incorporates a circle analysis unit 53a and an ellipse analysis unit 53b. The circle analysis unit 53a selects a circle 60 that is the most similar to the outline of the pupil 21 among the circles 60 for the pupil 21 prepared by the circle preparation unit 52a, and another circle 60 that is the most similar to the outline of the iris 22 among the circles 60 for the iris 22 prepared by the circle preparation units 52a. Further, the circle analysis unit 53a establishes a polar coordinate system based upon the selected two circles 60 to analyze the iris 22. Also, the ellipse analysis unit 53b establishes a polar coordinate system based upon an ellipse 70 for the pupil 21 and another ellipse 70 for the iris 22 prepared by the ellipse preparation unit 52b to analyze the iris 22.

The iris storage unit 54 stores a plurality of iris codes corresponding to the iris textures of individuals with a variety of data on the individuals. The iris comparison unit 55 compares an iris code to be identified with the iris codes stored in the iris storage unit 54. The comparison is classified into two types: a comparison for confirming whether or not the individual belongs to the group represented by the iris codes, and a comparison for retrieving data on one of the individuals. The iris comparison unit 55 incorporates a similarity calculation unit 55a and a similarity judgment unit 55b. The similarity calculation unit 55a calculates the similarity, for example, the Hamming distance, between the iris codes to be identified and the iris codes stored in the iris storage unit 54. Here, the Hamming distance of an iris code with respect to another iris code is defined as the number of all the bits of the former iris code and the number of bits that both the iris codes disagree with each other.

The similarity judgment unit 55b judges whether or not the iris code to be identified agrees with the iris codes by comparing the Hamming distance HD of the iris code with a predetermined distance, which serves as a predetermined threshold similarity value. If the Hamming distance HD is shorter than the predetermined distance, the similarity judgment unit 55b judges that both the iris codes agree with each other, thus outputting a signal indicating the coincidence to the closed curved-line preparation unit 52 and the comparison result output unit 56. Otherwise, the similarity judgment unit 55b judges that the iris code is not with any iris codes, thereby outputting a signal indicating the discordance thereto.

The comparison result output unit 56 outputs a comparison result in response to the signals fed by the similarity judgment unit 55b. More definitely, the comparison result output unit 56 outputs a comparison result indicative of an iris code with which the iris code to be identified coincides, in response to the signal indicating the coincidence given the similarity judgment unit 55b, while it outputs a comparison result indicative of an iris code that is the most similar to the iris code to be identified, in response to the signal indicating the discordance given thereby.

Figure 9:
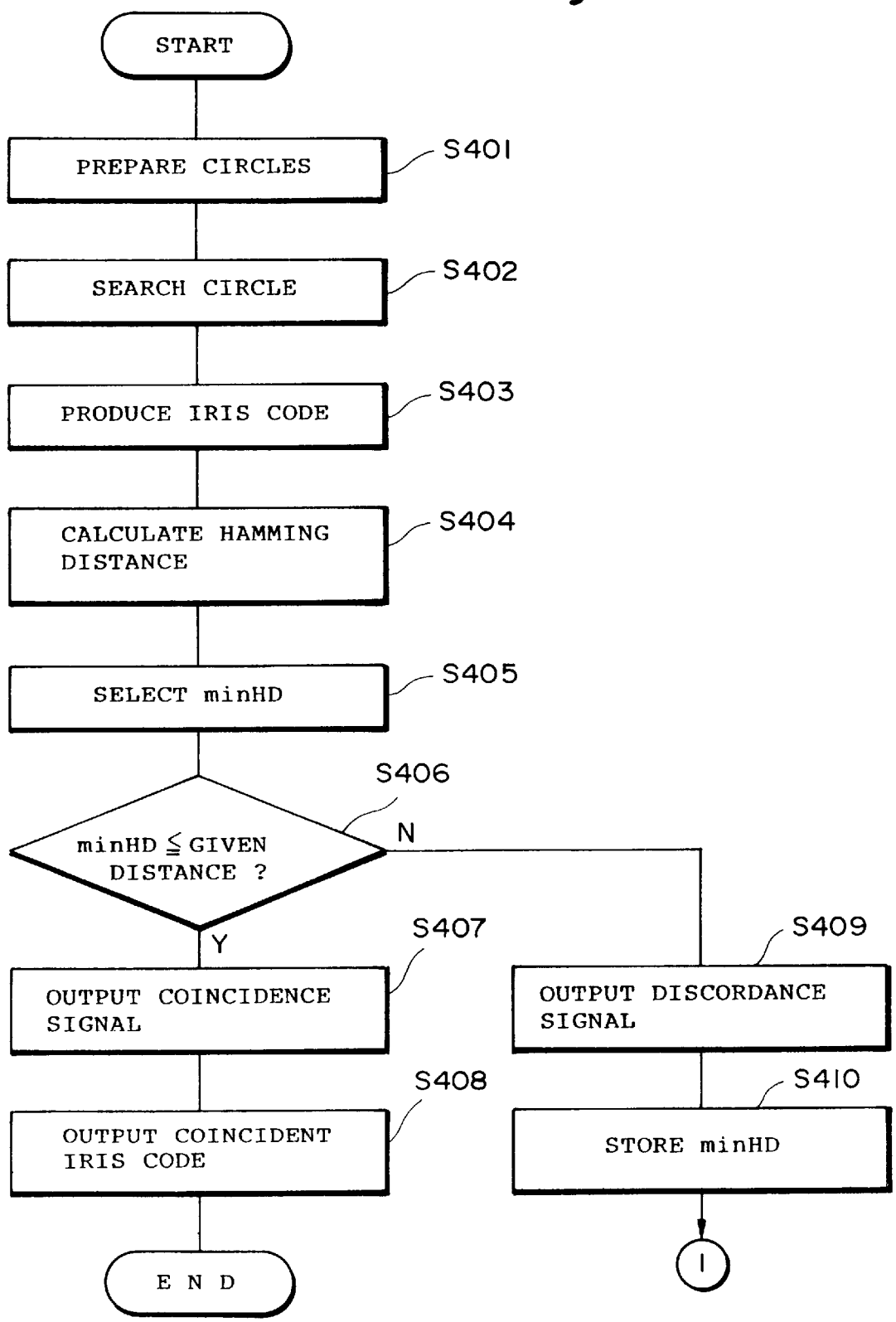
FIG. 9 and FIG. 10 are diagrams showing the processes of the individual identification system of the second embodiment.
Figure 10:
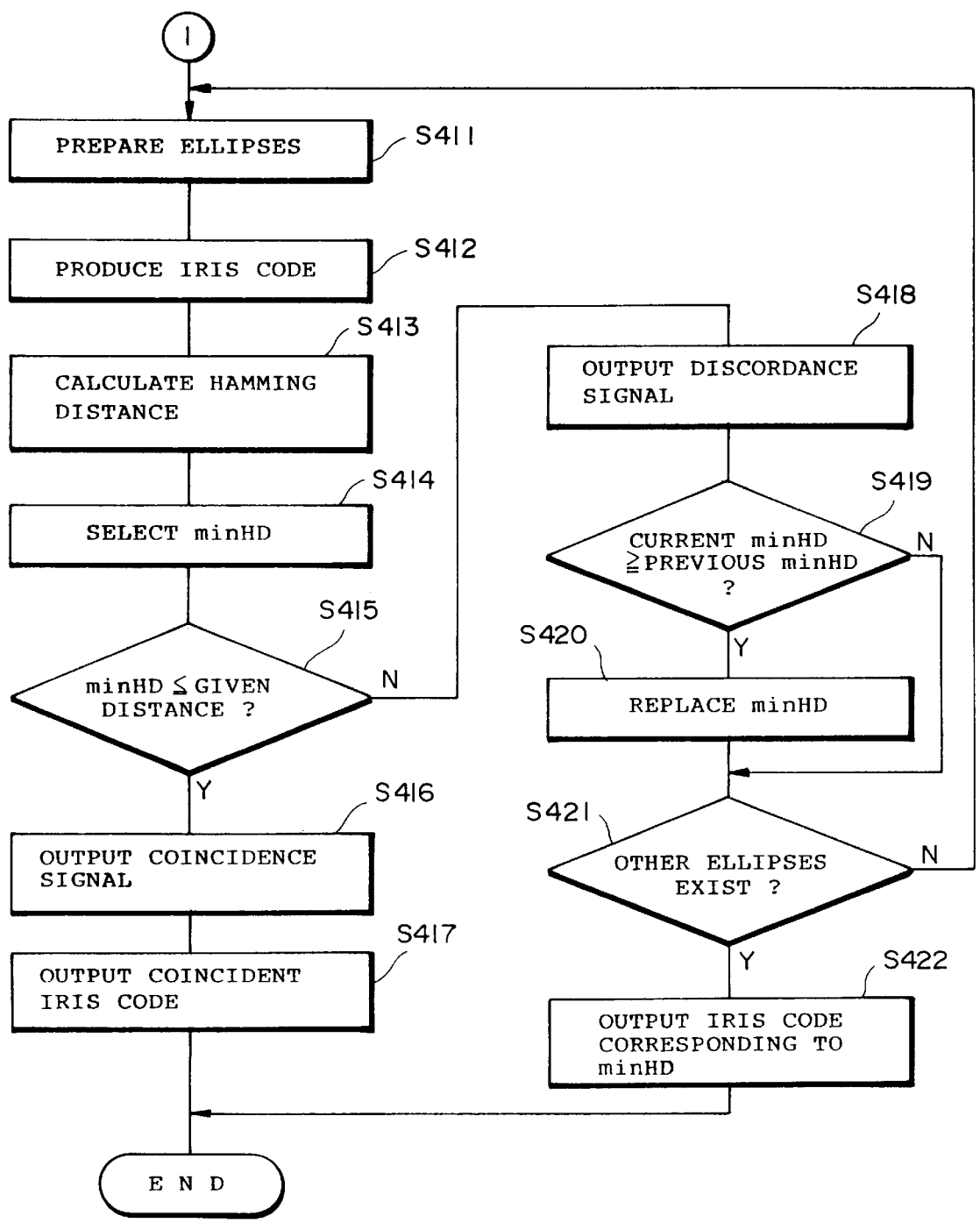
Figure 12A:
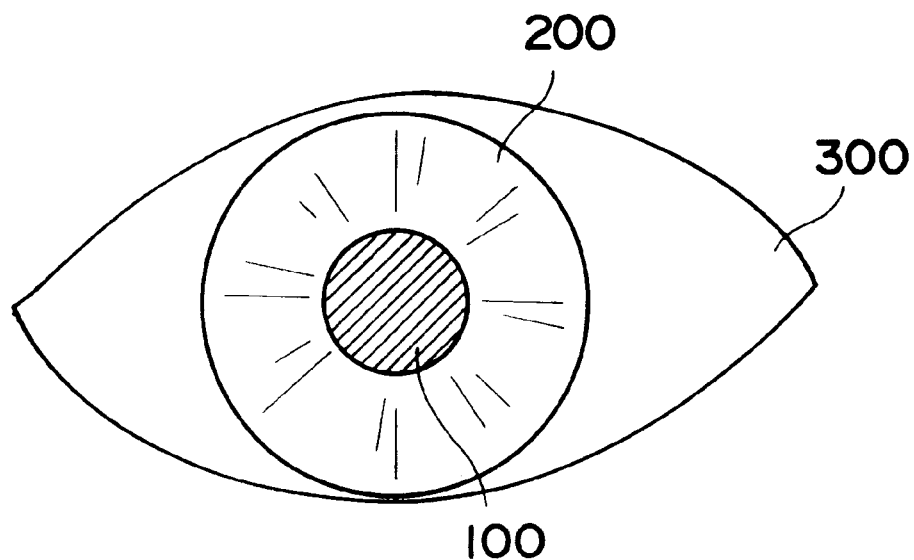
FIG. 12(a) and FIG. 12(b) are diagrams showing a circular eye and a elliptic eye.
Figure 12B:
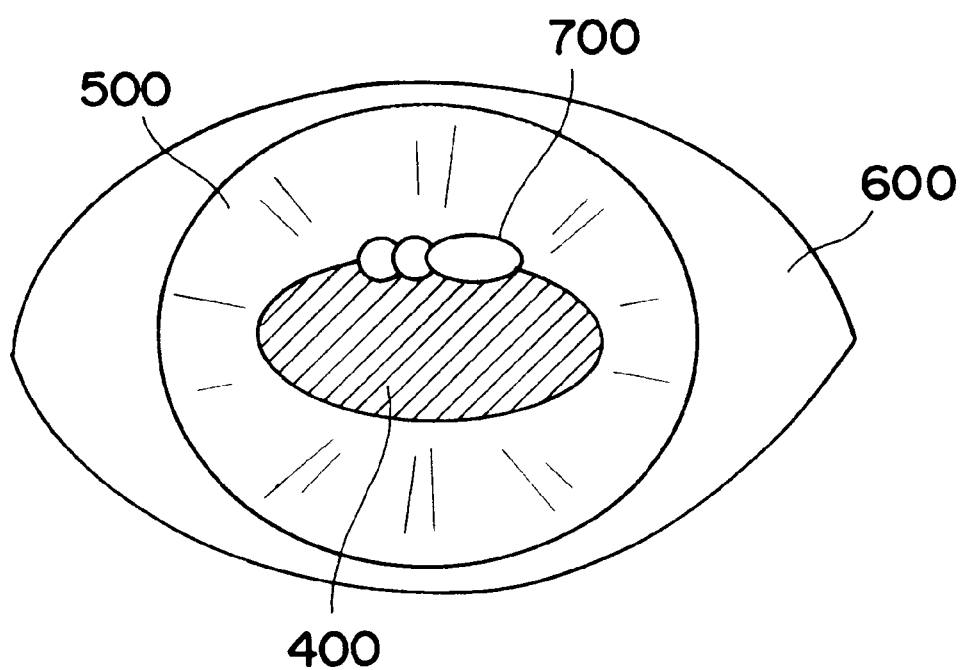
Figure 13A:
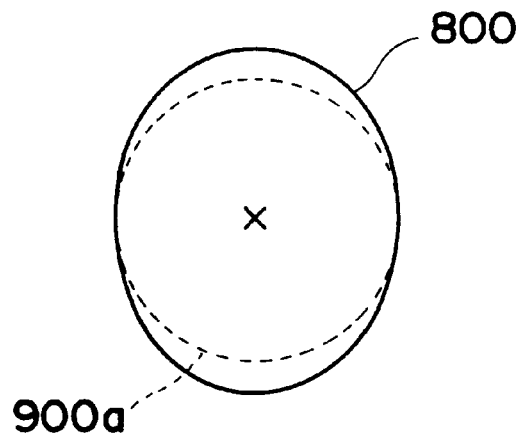
FIG. 13(a)–FIG. 13(c) are diagrams showing the relation between an elliptic pupil and a circle.
Figure 13B:
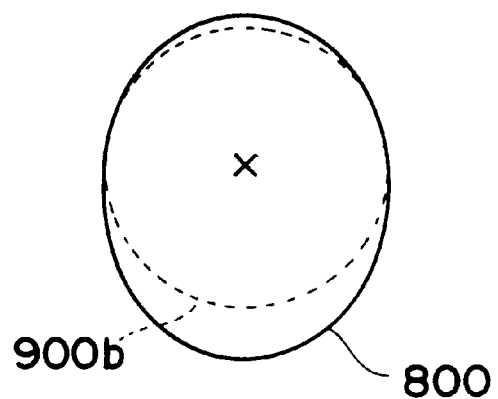
Figure 13C:
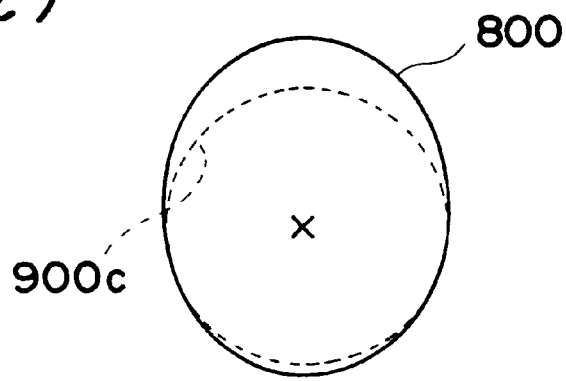

Hereinafter, the operation of the individual identification system according to the second embodiment will be described with reference to flowcharts depicted in FIGS. 9 and 10. The explanation will proceed on the assumption that an iris code to be identified which is stored in the image storage unit 51 is compared with a plurality of iris codes stored in the iris storage unit 54.

First, in step 401, the circle preparation unit 52a prepares a plurality of circles similar to a pupil 21 laid in an eye image 20 to be identified which is stored in the image storage unit 51 and another plurality of circles similar to an iris 22 laid therein. In step 402, the circle analysis unit 53a searches among the plurality of circles similar to the pupil 21, one that is the most similar to the pupil 21, and also searches among the plurality of circles similar to the iris 22, one that is the most similar to the iris 22. Using the two circles, a polar coordinate system is established, in which an iris code to be identified is produced, in step 403.

Subsequently, in step 404, the similarity calculation unit 55a calculates Hamming distances HDs between the iris code to be identified and a plurality of iris codes stored in the iris storage unit 54, respectively. The similarity judgment unit 55b selects the minimum Hamming distance minHD among the Hamming distance HDs in step 405. In step 406, the minimum Hamming distance min HD is judged to be shorter or not than a given distance. If yes, the similarity judgment unit 55b outputs a signal denoting the coincidence to the closed curved-line preparation unit 52 and the comparison result output unit 56 in step 407. In response to the signal indicative of the coincidence, the comparison result output unit 56 outputs a comparison result representing that the iris code with which the iris code to be identified coincides, in step 408. If no, the similarity judgment unit 55b outputs a signal denoting the discordance in step 409. In step 410, in response to the signal indicative of the discordance, the comparison result output unit 56 stores the minimum Hamming distance minHD that the iris comparison unit 55 selected in step 405, and the iris code responding thereto. Thereafter, the procedure advances to step 411 in FIG. 10.

Once the signal of the discordance is fed into the closed curved-line preparation unit 52, the ellipse preparation unit 52b prepares an ellipse 70 similar to the pupil 21 and an ellipse 70 similar to the iris, in step 411. In step 412, the ellipse analysis unit 53b establishes a polar coordinate system using the above two ellipses 70, analyzes the iris on the polar coordinate system, and produces an iris code representing the iris 22 in step 412.

Next, the similarity calculation unit 55a calculates Hamming distance HDs between the produced iris code to be identified and a plurality of iris codes stored in the iris storage unit 54 in step 413. The similarity judgment unit 55b selects the minimum Hamming distance minHD among the plurality of Hamming distance HDs in step 414.

The selected minimum Hamming distance minHD is judged to be shorter or not than the given distance in step 415. If yes, the similarity judgment unit 55b outputs a signal indicative of coincidence to the closed curved-line preparation unit 52 and the comparison result output unit 56 in step 416. In response to the signal of the coincidence, the comparison result output unit 56 outputs a comparison result signal representing that the iris code to be identified agrees with the iris code corresponding to the minimum Hamming distance minHD, in step 417.

On the contrary, if not, the similarity judgment unit 55b output a signal indicative of discordance in step 418. In step 419, the comparison result output unit 56 judges whether or not the minimum Hamming distance minHD now given by the iris comparison unit 55 is shorter than the minimum Hamming distance minHD that has been previously given by the iris comparison unit 55. If yes, the new minimum Hamming distance minHD is stored in place of the previous minimum Hamming distance minHD in step 420. Further, in step 421, it is confirmed that preparation of all the ellipses are completed, or that there still exists any other ellipses to be prepared. If there is no ellipse to be prepared, the comparison result output unit 56 outputs a comparison result signal, that is to say, the iris code corresponding to the remaining minimum Hamming distance minHD. Thus, all the processes are completed. To the contrary, if there is any other ellipse to be prepared, the procedure returns to step 411 to prepare another ellipse.

Figure 11:
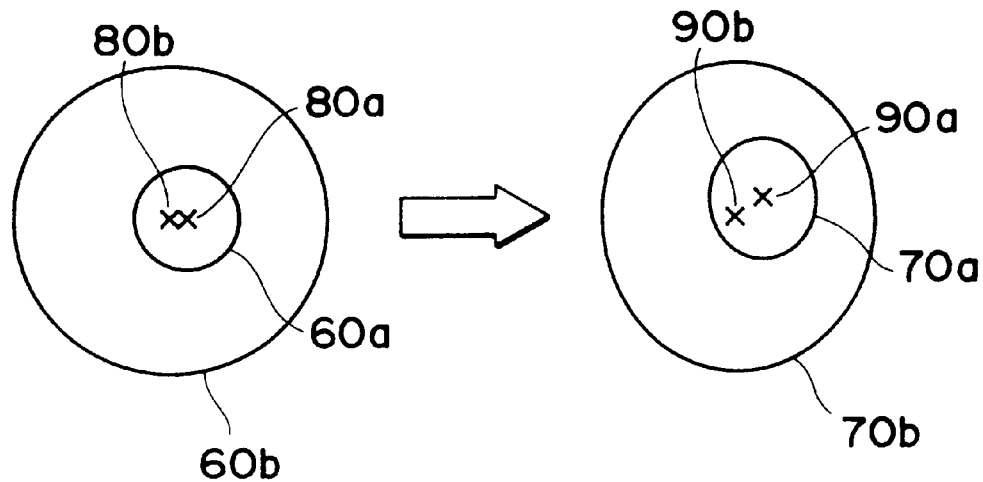
FIG. 11 is a diagram showing the change from circles to ellipses.

FIG. 11 depicts circles and ellipses used for individual identification of an elliptical pupil 21 and an elliptical iris 22. The circle 60a having the center 80a and the circle 60b having the center 80b cannot be used for individual identification of the elliptical pupil 21 and the elliptical iris 22. In place of them, however, the ellipse 70a having the center 90a and the ellipse 70b having the center 90b succeed in representing the elliptical pupil 21 and the elliptical iris 22, respectively.

As described above, in the individual identification system according to the second embodiment, if an iris code produced using a circle proves to agree with no one of the plurality of iris codes, another iris code is produced using an ellipse. Therefore, even though there is given a deformed eye image or a inclined eye image, it is possible to obtain the iris code which is accurately representative of the elliptical iris laid in such an eye image.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An individual identification system which identifies individuals by comparing irises thereof, comprising:

a first closed curved-line preparation circuit preparing a first closed curved-line similar to the iris;

a first similarity calculation circuit calculating a first similarity between the iris and the first closed curved-line;

a first judgment circuit judging whether or not the first similarity satisfies a first predetermined threshold similarity value;

a first decision circuit deciding that the first closed curved-line is representative of the outline of the iris upon judgment that the first similarity satisfies the first predetermined threshold similarity value;

a second closed curved-line preparation circuit preparing a second closed curved-line similar to the iris upon judgment that the first similarity does not satisfy the first predetermined threshold similarity value;

a second similarity calculation circuit calculating a second similarity between the iris and the second closed curved-line;

a second judgment circuit judging whether or not the second similarity satisfies a second predetermined threshold similarity value; and a second decision circuit deciding that the second closed curved-line is representative of the outline of the iris upon judgment that the second similarity satisfies the second predetermined threshold similarity value, said second decision circuit selecting a second closed curved-line that is the most similar to the iris among a plurality of second closed curvedlines upon judgment that no second similarity satisfies the second predetermined threshold similarity value, and deciding that the selected second closed curved-line is representative of the outline of the iris.

2. The iris position detecting system claimed in claim 1, wherein the first similarity calculation circuit and/or the second similarity calculation circuit calculates the Hamming distance of a first iris code with respect to a second iris code, said Hamming distance being defined as the number of all the bits of the first iris code and the number of bits by which the first and second iris codes disagree with each other.

3. The iris position detecting system claimed in claim 1 wherein the outline of the iris is a boundary between a pupil and the iris.

4. The iris position detecting system claimed in claim 1 wherein the outline of the iris is a boundary between the iris and a sclera.

5. An individual identification system which identifies individuals by comparing irises thereof, comprising:

a first closed curved-line preparation circuit preparing a first closed curved-line similar to the iris;

a first similarity calculation circuit calculating a first similarity between the iris and the first closed curved-line;

a first judgment circuit judging whether or not the first similarity satisfies a first predetermined threshold similarity value;

a first decision circuit deciding that the first closed curved-line is representative of the outline of the iris upon judgment that the first similarity satisfies the first predetermined threshold similarity value;

a second closed curved-line preparation circuit preparing a second closed curved-line similar to the iris upon judgment that the first similarity does not satisfy the first predetermined threshold similarity value;

a second similarity calculation circuit calculating a second similarity between the iris and the second closed curved-line;

a second judgment circuit judging whether or not the second similarity satisfies a second predetermined threshold similarity value; and a second decision circuit deciding that the second closed curved-line is representative of the outline of the iris upon judgment that the second similarity satisfies the second predetermined threshold similarity value, and wherein said first closed curved-line is an ellipse similar to the iris, and the second closed curved-line is an ellipse similar to the first closed curved-line, wherein the second closed curved-line prepared by the second closed curved-line preparation circuit has changing parameters of an ellipse, and wherein a parameter of said ellipse is a ratio of a line of apsides to a minor axis of said ellipse.

6. The iris position detecting system claimed in claim 5, wherein the first similarity calculation circuit and/or the second similarity calculating circuit calculates the Hamming distance of a first iris code with respect to a second iris code, said Hamming distance being defined as the number of all the bits of the first iris code and the number of bits by which the first and second iris codes disagree with each other.

7. An individual identification system which identifies individuals by comparing irises thereof, comprising:

a first closed curved-line preparation circuit preparing a first closed curved-line similar to the iris;

a first similarity calculation circuit calculating a first similarity between the iris and the first closed curved-line;

a first judgment circuit judging whether or not the first similarity satisfies a first predetermined threshold similarity value;

a first decision circuit deciding that the first closed curved-line is representative of the outline of the iris upon judgment that the first similarity satisfies the first predetermined threshold similarity value;

a second closed curved-line preparation circuit preparing a second closed curved-line similar to the iris upon judgment that the first similarity does not satisfy the first predetermined threshold similarity value;

a second similarity calculation circuit calculating a second similarity between the iris and the second closed curved-line;

a second judgment circuit judging whether or not the second similarity satisfies a second predetermined threshold similarity value; and a second decision circuit deciding that the second closed curved-line is representative of the outline of the iris upon judgment that the second similarity satisfies the second predetermined threshold similarity value, and wherein said first closed curved-line is an ellipse similar to the iris, and the second closed curved-line is an ellipse similar to the first closed curved-line, wherein the second closed curved-line prepared by the second closed curved-line preparation circuit has changing parameters of an ellipse, and wherein a parameter of said ellipse is an inclination of a line of apsides to an X coordinate axis of said ellipse.

8. The iris position detecting system claimed in claim 7 wherein a parameter of said ellipse is the center coordinate thereof.

9. An apparatus for identifying an individual from the texture of the iris of the individual's eye, comprising:

an image storage unit for storing images of a plurality of human individuals' eyes, each of said eyes having a pupil and an iris therein;

a closed curved-line preparation unit including:
  a circle preparation unit for generating circles as the closed curved-lines; and
  an ellipse preparation unit for generating ellipses as the closed curved lines;

an iris analysis unit coupled to said image storage unit and said closed curved-line preparation unit for analyzing irises stored in said image storage unit based upon the closed curved-lines generated by said closed curved-line preparation unit, said iris analysis unit including:
  a circle analysis unit for selecting first and second circles from said circle preparation unit that correspond most closely to the outlines of a pupil and an iris stored in said storage unit, said circle analysis unit further establishing a polar coordinate system based upon said first and second circles; and
  an ellipse analysis unit for selecting first and second ellipses from said ellipse preparation unit that correspond most closely to the outlines of the pupil and the iris stored in said storage unit, said ellipse analysis unit further establishing a polar coordinate system based upon said first and second ellipses;

an iris storage unit for storing a plurality of iris codes, each of said iris codes corresponding to the texture of an iris forming an image stored in said image storage unit;

a comparison result output unit; and an iris comparison unit coupled to said iris analysis unit, said closed curved-line preparation unit, said iris storage unit and said comparison result output unit for comparing an iris code stored in said image storing unit with the plurality of iris codes stored in said iris storage unit, said iris comparison unit including:
  a similarity calculation unit for calculating the similarity between an iris code to be identified, stored in said image storing unit, and the iris codes stored in said iris storage unit; and
  a similarity judgment unit for determining whether the iris code to be identified agrees or does not agree with an iris code stored in said iris storage unit, whereby if said codes agree said similarity judgment unit outputs a signal indicating coincidence between said iris codes, and if said codes do not agree said similarity judgment unit outputs a signal identifying an iris code most similar to the iris code to be identified, wherein said similarity calculating unit calculates the similarity between the iris code to be identified which is stored in said image storing unit, and the iris codes stored in said iris storage unit by calculating the Hamming distance between the iris code to be identified and each of the iris codes stored in said iris storage unit, and wherein said similarity judgment unit determines whether the lowest Hamming distance calculated is less than a predetermined Hamming distance, and wherein if the lowest Hamming distance calculated is less than said predetermined Hamming distance, said similarity judgment unit outputs a signal denoting a coincidence between the iris code to be identified and an iris code stored in said iris storage unit, and if the lowest Hamming distance calculated is not less than said predetermined Hamming distance, said similarity judgment unit outputs a signal denoting a lack of coincidence between the iris code to be identified and an iris code stored in said iris storage unit.

10. A method of identifying an individual by comparing the texture of the iris of the individual's eye with a plurality of ellipses, the ellipse being prepared by steps comprising:

(a) generating a first ellipse having a center $X_c$, $Y_c$ and a line of apsides A having a ratio $\beta$ thereof to a minor axis of the ellipse, a circumference of the ellipse having a plurality of pixels each designated by a pixel number M;

(b) incrementing the value of M up to a variable pixel sum PS;

(c) deciding whether the incremented value of M is equal to or greater than a maximum value Mmax, if a pixel sum PS is not equal to or greater than Mmax repeating steps (a) and (b), and if a pixel sum PS is equal to or greater than Mmax storing said pixel sum, the stored pixel sums PS corresponding to ellipses representing the boundary of the iris and a pupil of the individual's eye;

(d) incrementing said line of apsides A in discrete steps;

(e) deciding whether the incremented value obtained by step (d) is greater than a maximum value Amax, if the incremental value obtained by step (d) is not greater than Amax repeating steps (a), (b) and (c), and if the incremental value obtained by step (d) is greater than Amax storing said value of A; and (f) searching said values of A to determine which of said values results in the largest difference between a first pixel sum PS corresponding to first value of A and a second pixel sum corresponding to a second value of A, whereby an ellipse is identified which is most similar to the boundary between the iris and the pupil of the individual's eye.

* * * * *